US012299452B2

(12) United States Patent
Vegas et al.

(10) Patent No.: US 12,299,452 B2
(45) Date of Patent: May 13, 2025

(54) REMOTE FRONT-DROP FOR RECOVERY AFTER PIPELINE STALL

(71) Applicant: Cisco Technology, Inc., San Jose, CA (US)

(72) Inventors: Thomas Vegas, Gland (CH); Domenico Ficara, Essertines-sur-Yverd (CH); Anirban Karmakar, Ecublens (CH); Giacomo Trifilo, Pully (CH); Amine Choukir, Ecublens (CH)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 17/571,906

(22) Filed: Jan. 10, 2022

(65) Prior Publication Data

US 2023/0221961 A1  Jul. 13, 2023

(51) Int. Cl.
*G06F 9/38* (2018.01)
(52) U.S. Cl.
CPC .......... *G06F 9/3861* (2013.01); *G06F 9/3867* (2013.01)
(58) Field of Classification Search
CPC ..... G06F 9/3861; G06F 9/3867; H04L 47/10; H04L 47/11; H04L 47/12; H04L 47/26; H04L 47/263; H04L 47/267; H04L 47/28; H04L 47/283; H04L 47/32
See application file for complete search history.

(56) References Cited

U.S. PATENT DOCUMENTS

| | | | | |
|---|---|---|---|---|
| 5,650,993 A | * | 7/1997 | Lakshman | H04Q 11/0478 370/236 |
| 5,923,893 A | * | 7/1999 | Moyer | G06F 9/3012 712/E9.067 |
| 2006/0203730 A1 | * | 9/2006 | Zur | H04L 47/2441 370/395.43 |
| 2008/0192060 A1 | * | 8/2008 | Ogiso | G09G 5/399 345/546 |
| 2013/0013898 A1 | | 1/2013 | Merten et al. | |

(Continued)

FOREIGN PATENT DOCUMENTS

EP  1766510 A1  3/2007

OTHER PUBLICATIONS

Yin et al., "Implication of Dropping Packets from the Front of a Queue", IEEE Transactions on Communications, vol. 41, No. 6, Jun. 1993, pp. 846-851.*
Briscoe et al., "Reducing Internet Latency: A Survey of Techniques and Their Merits", IEEE Communication Surveys & Tutorials, vol. 18, No. 3, 2016, pp. 2149-2196.*

(Continued)

*Primary Examiner* — David J. Huisman
(74) *Attorney, Agent, or Firm* — Lee & Hayes, P.C.

(57) ABSTRACT

This disclosure describes techniques for performing a remote front-drop of data for recovery after a pipeline stall. The techniques include using a receiver-side dropping strategy that is driven from the sender-side. Components of a pipeline determine whether a pipeline is operating within specified latency constraints (e.g., experiencing a pipeline stall). Upon detecting a pipeline stall, the sending device is notified of the stall. Once the sending device is notified of the pipeline stall, the sending device can determine what action(s) to perform to address the pipeline stall. For example, the sending device may instruct one or more components of the pipeline to discard already sent data that has not been processed. This allows the older data to be dropped on the stalled pipeline while keeping the more recently sent data.

21 Claims, 5 Drawing Sheets

(56) References Cited

U.S. PATENT DOCUMENTS

2016/0087898 A1* 3/2016 Ansari ............... H04L 43/0876
                                                    370/235
2016/0302197 A1* 10/2016 Xie ..................... H04L 5/0055
2017/0187597 A1   6/2017 Nolan et al.
2018/0006913 A1   1/2018 Asenjo et al.
2018/0278496 A1   9/2018 Kulshreshtha et al.
2018/0308209 A1* 10/2018 Ramadoss ............ G06F 9/4806
2019/0073373 A1   3/2019 Surale et al.
2021/0067849 A1   3/2021 Kulshreshtha et al.
2022/0078119 A1*  3/2022 Goyal ................... H04L 47/30

OTHER PUBLICATIONS

Zhou et al., "TCP Stalls at the Server Side: Measurement and Mitigation", IEEE/ACM Transactions on Networking, vol. 27, No. 1, Feb. 2019, pp. 272-287.*
Goyal et al., "Backpressure Flow Control", Mar. 29, 2021, pp. 1-26.*
CPCT Search Report and Written Opinion mailed Mar. 22, 2023 for PCT application No. PCT/US2023/010191, 11 pages.

\* cited by examiner

REMOTE FRONT-DROP FOR RECOVERY AFTER PIPELINE STALL

TECHNICAL FIELD

The present disclosure relates generally to using a feedback loop for performing remote front-drop for minimizing recovery latency.

BACKGROUND

The Internet of Things (IoT) includes a large number of devices such as sensors, processors, software, and other technologies, that connect and exchange data with other devices and systems over the Internet or other communication networks. These devices often send data for processing to remote devices, such as devices associated with a cloud service. This data may be processed by different components within a processing pipeline. In some cases, however, one or more of the components of the processing pipeline may be unable to process the incoming data. This can cause the processing pipeline to stall thereby causing delays in the processing of the data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for performing a remote front-drop of data for recovery after a pipeline stall. The techniques include using a receiver-side dropping strategy that is driven from the sender-side. In this way, the oldest events received by the pipeline may be dropped first, even if the event(s) are already waiting to be processed in the pipeline. As used herein, a "pipeline" refers to one or more data processing components/devices (which may be referred to herein as "a pipeline processing point" or "processing point") connected in series that are configured to perform data processing on data received by a sending component/device. A "pipeline stall" as used herein refers to one or more of the pipeline processing points (e.g., a data processing component) of the pipeline failing to process received data at a specified latency constraint. For example, if a pipeline processing point is unable to process data at a specified rate, the pipeline may in a pipeline stall state.

According to some examples, when a pipeline stall is detected, such as by a processing point of the pipeline (e.g., a device/component), the pipeline sends a signal/message to the sending device that indicates that the pipeline is stalled. The sending device, or some other device/component, can then determine what action(s) to perform to address the pipeline stall. For example, the sending device may queue data/messages at the sender, and/or instruct one or more processing points of the pipeline on what messages/data to drop. In some configurations, the processing point of the pipeline that was experiencing the problem may send a signal to the sender indicating that the pipeline processing point is no longer experiencing a pipeline stall. The techniques described herein may be performed by a system and/or one or more device(s) having non-transitory computer-readable media storing computer-executable instructions that, when executed by one or more processors, performs the methods described.

EXAMPLE EMBODIMENTS

Cloud applications that perform processing for IoT devices, or other devices are becoming more widely used. The different devices may be at different locations, and the cloud applications may transmit/receive data from the devices over one or more networks, such as the Internet. In some examples, different processing points (e.g., devices/components) are associated with a pipeline and are configured to perform data processing for data received from one or more sending devices. According to some configurations, the pipeline is configured to process large amounts of online streaming data in real-time or near real-time. A pipeline may have specified latency constraints to which it is to adhere, but the pipeline can be vulnerable to failures that result in a pipeline stall. Failure recoveries may slow down the entire processing pipeline and break the latency constraints.

For instance, in some cases, a pipeline may be unable to process the incoming data received from a sending device/component in a timely manner (e.g., fail to process the incoming data at the specified latency constraints) and experience a pipeline stall. Prior to techniques described herein, when a processing pipeline stalls, the oldest events in the processing pipeline were processed during the recovery of the pipeline before processing the more recent data, thereby leading to a "recovery latency" time period. As used herein, the term "recovery latency" refers to a time it takes the processing pipeline to begin processing data within the defined latency constraints for the processing pipeline.

Using techniques described herein, a pipeline determines whether it is operating within the specified latency constraints and/or experiencing a pipeline stall. In some examples, processing points of the pipeline are configured to determine when a pipeline stall condition exists. As briefly discussed above, once the sending device is notified of the pipeline stall, the sending device can determine what action (s) to perform to address the pipeline stall. For example, the sending device may instruct one or more components of the pipeline to discard already sent data that has not been processed. This allows the older data to be dropped on the stalled pipeline while keeping the more recently sent data. In this way, more recently received data can be processed and the oldest data may be dropped even if that older data are already waiting to be processed by the remote processing pipeline.

In other configurations, the sending device may queue messages at the sender, instruct the stalled pipeline what messages/data to drop, drop data (e.g., periodically, according to a schedule, . . . ) before it is sent, instruct one or more of the processing points to process data according to when the data was sent (e.g., using a timestamp), and the like. In some configurations, the pipeline that was experiencing the problem may send a message to the sending device indicating that the pipeline stall is resolved.

According to some examples, one or more of the processing points of the pipeline maintain a buffer/queue that is configured to store data, received from a sending device. Generally, the buffer/queue is configured to store a predetermined amount of data. When the buffer of a processing pipeline becomes full, the processing pipeline may experience a pipeline stall.

According to some configurations, the sending device may receive information from the remote pipeline as to the states of the different processing points within the pipeline. For instance, the sending device may receive information from the remote processing pipeline indicating buffer states (e.g., full, near full, empty), and/or indicating that the pipeline has experienced some other condition/event. In response to receiving the information, the sending device may cause one or more actions to be performed. Some actions include, but are not limited to dropping a specified amount of data from a buffer associated with a remote processing pipeline, storing data at the sending device, dropping data at a specified rate, stop dropping data at the specified rate, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
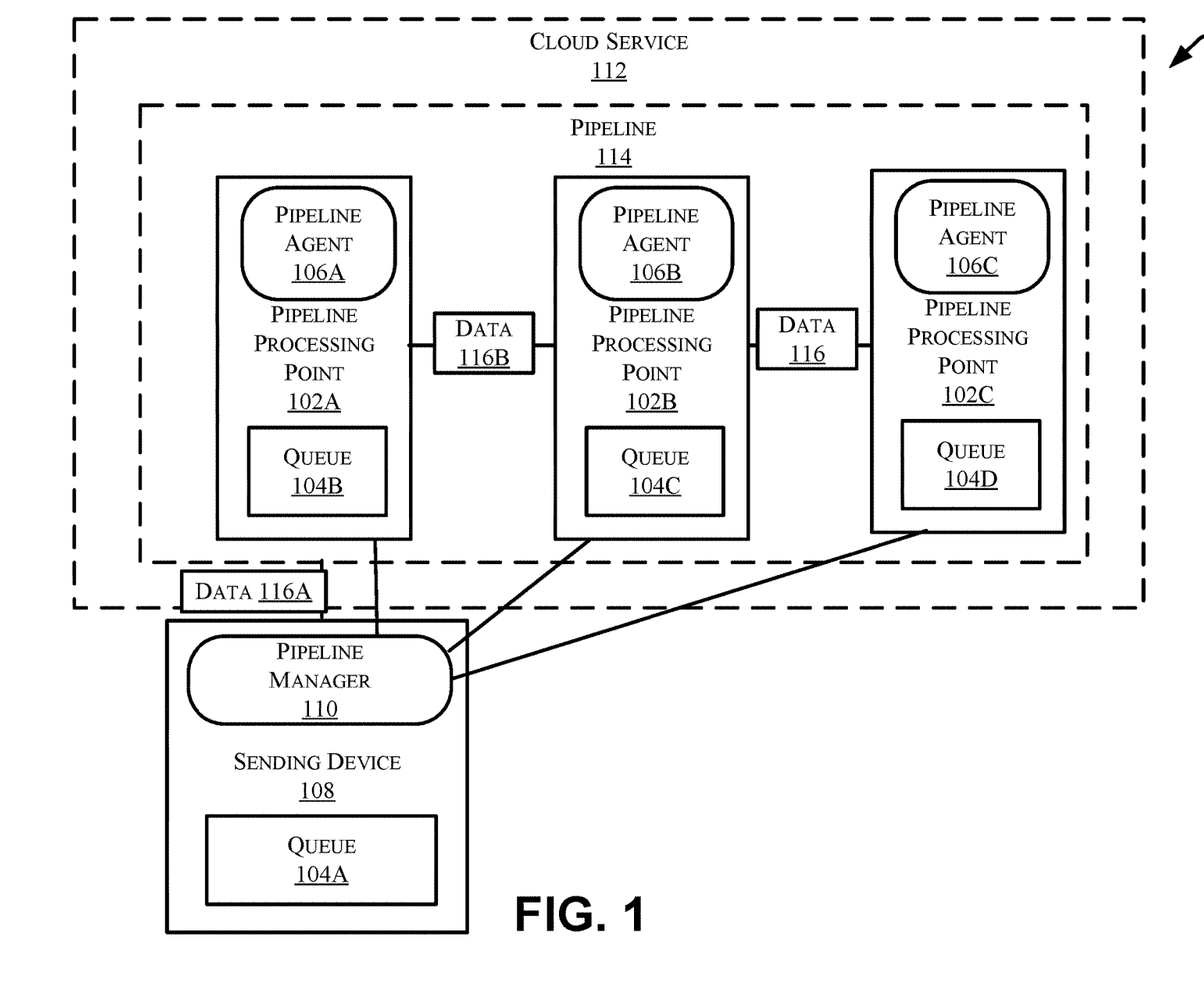
FIG. 1 illustrates a system that uses pipeline agents to help communicate pipeline information to a sending device for recovery of a pipeline stall.

FIG. 1 illustrates a system 100 that uses pipeline agents 106 to help communicate pipeline information to a sending device 108 for recovery of a pipeline stall. As illustrated in FIG. 1, a cloud service 112 includes a pipeline 114 that performs processing for data received from sending device 108. While one sending device 108 is illustrated the pipeline may perform processing for different sending devices 108. In some examples, the sending device 108 is located remotely from the cloud service 112 and communicates with the cloud service 112 via a network, such as the Internet.

As illustrated in system 100, the pipeline 114 includes different pipeline processing points 102A, 102B, and 102C that can be used to perform processing on received data. While three processing points 102 are illustrated the pipeline 114 may include any number of processing points 102. The processing points 102 may be devices/components/applications or some other hardware/software that is configured to perform processing on data, such as data 116. In some configurations, each of the processing points 102A-102C includes a buffer/queue 104B-104D that store data received from the sending device. The queues 104 may be configured to store a predetermined amount of data/messages from the sending device (e.g., 5 messages, 100 messages, 1000 messages, . . . ).

A pipeline manager 110 may be configured to communicate with each of the different processing points 102. In this way, the pipeline manager 110 may communicate with any of the different processing points 102. For example, the pipeline manager 110 may receive information from each of the different processing points 102 indicating a state of the pipeline 114 at the processing point (e.g., pipeline stalled, queue 104 is full, . . . ) and may send information to the different processing points 102 to cause different actions to perform to resolve a pipeline stall. In some examples, the sending device 108 may include a buffer/queue 104A to store data to be sent to the pipeline 114 for processing.

As briefly discussed above, a pipeline 114 may be configured to process data 116A according to specified latency constraints. For example, the latency constraints may be based on the type of application being utilized by the sending device. As such, some pipelines 114 may have lower latency constraints (e.g., real time applications) as compared to other applications. In some cases, however, a pipeline processing point 102 may fail to process incoming data 116A at the desired rate and fail to meet the latency constraints associated with the pipeline. Recovery from these pipeline stalls can cause even more of a delay due at least in part to processing old data before more recent data.

Using techniques described herein, processing points 102 of a pipeline 114 determine whether the pipeline 114 is operating within the specified latency constraints or experiencing a pipeline stall. As an example, a processing point 102, such as processing point 102A may determine, using pipeline agent 106A, that processing point 102B is no longer processing data 116B sent by the processing point 102A. For instance, the pipeline point 102B may not be acknowledging receipt of data 116B from the pipeline point 102A. This may be a result of many different types of conditions. Upon determining that the pipeline processing point 102B is experiencing a pipeline stall, the pipeline agent 106A sends a message to the pipeline manager 110 indicating the pipeline stall. In some examples, the processing point 102B experiencing the pipeline stall may send a message to the pipeline manager 110 of the sending device 108.

As discussed above, once the sending device 108 is notified of the pipeline stall, the pipeline manager 110, or some other device/component, can determine what action(s) to perform to address the pipeline stall. Some actions include, but are not limited to dropping a specified amount of data from a queue 104 associated with the pipeline 114, storing data within a queue 104A at the sending device 108, dropping data at a specified rate (e.g., either at the sending device and/or at one or more of the processing points 102, stop dropping data at the specified rate, and the like.

For instance, the pipeline manager 110 may instruct the processing point 102B to discard already sent data 116B that has not been processed. This may result in the processing point 102B front-dropping data 116B from queue 104C so that more recent data remains in the queue 104C to be processed. In this way, more recently received data can be processed and the oldest data may be dropped even if that older data are already waiting to be processed by the remote processing pipeline.

In other configurations, the sending device 108 can adjust the data 116A sent based on the processing ability of the pipeline 114. In this case, the pipeline manager 110 can generate data 116A (events) based on the processing ability of the pipeline 114. As such, the data 116A can be produced without losing the transactional nature of a functional workflow. This is different from dropping data 116, as the functional meaning of the data 116 is preserved. The sending device 108 knows what amount of data 116A can and likely will be processed by the remote processing points 102 and is able to generate the appropriate amount of events/data.

In other configurations, the sending device 108 may queue messages within the queue 104A at the sender, instruct one or more processing points 102 of the stalled pipeline what messages/data to drop, drop data (e.g., periodically, according to a schedule, . . . ) before the data 116A is sent by the sending device 108, instruct one or more of the processing points 102 to process data according to when the data was sent (e.g., using a timestamp), and the like. In some configurations, one or more of the processing points 102 of the pipeline 114 that was experiencing the problem may send a message to the sending device 108 indicating that the pipeline stall is resolved.

According to some configurations, the pipeline manager 110 of the sending device 108 may receive information from the pipeline 114 as to the states of the different processing points 102 within the pipeline 114. For instance, the sending device 108 may receive information from the different processing points 102 of the pipeline 114 indicating buffer states (e.g., full, near full, empty) of the queues 104, and/or indicating that the pipeline 114 has experienced some other condition/event (e.g., lost network connectivity, computing failure, . . . ). In response to receiving the information, the sending device 108 may determine the actions to perform.

As discussed, instructing a processing point 102 to drop old data (that is ready to be processed) allows for more efficient dropping of stale data. Instead of the pipeline 114 determining what data to drop, the decision may be made by the sending device 108 (e.g., an application, a component, . . . ) that has knowledge of what events can/should be dropped. Even if one processing point 102 of the pipeline 114 becomes stalled, other processing points 102 that are part of the pipeline 114 can continue to process data. Also, since the stale data can be dropped, the recovery period is shorter as compared to waiting for stale data to be processed.

The following is an example of the operation of recovering from a pipeline stall of pipeline 114. For purposes of explanation, assume that each of the processing points 102 have a queue 104 that stores three events and the sending device has a queue that stores three events. Also assume that sending device 108 has three different events (E10, E9, E8) that are waiting to be sent to processing points 102A. Processing point 102A has events E7, E6, and E5 waiting to be processed and then send to processing point 102B for further processing. Processing point 102B has events E4, E3, and E2 waiting to be processed and then sent to processing point 102C for further processing. Processing point 102C has events E1 and E0 waiting to be processed. From above, the event E3 is in the queue of the processing pipeline 114. Event E8 is the next event to be transferred to the pipeline 114, waiting in the sending device queue 104A.

Assume that while a processing point 102A is clogged, one or more events (E18, E17, E16) are ready to be sent to be processed by the pipeline 114. Prior to techniques described herein, the sending device 108 would perform a front drop (e.g., a First In First Out) drop from its queue resulting in sending device having (E18, E17, E16) while processing point 102A continues to have events E7, E6, and E5, processing point 102B continues to have events E4, E3, and E2, and processing point 102C continues to have events E1 and E0. In this scenario, when the pipeline stall is resolved, and processing continues by the pipeline 114, events E0-E7 are processed before the latest events E16-E18 can be processed. This results in a recovery latency period that prevents the latest events from being processed.

Using the techniques described herein, the sending device 108 instructs the different processing points 102A to perform remote front-drops such that the older events are discarded and the newer events are stored within the queue for processing. This results in the sending device having (E18, E17, E16) while processing point 102A has events E15, E14, and E13, processing point 102B has events E12, E11, and E10, and processing point 102C has events E9 and E8. In this scenario, when the pipeline stall is resolved, and processing continues by the pipeline 114, the latest events E8-E18 are processed.

Figure 2:
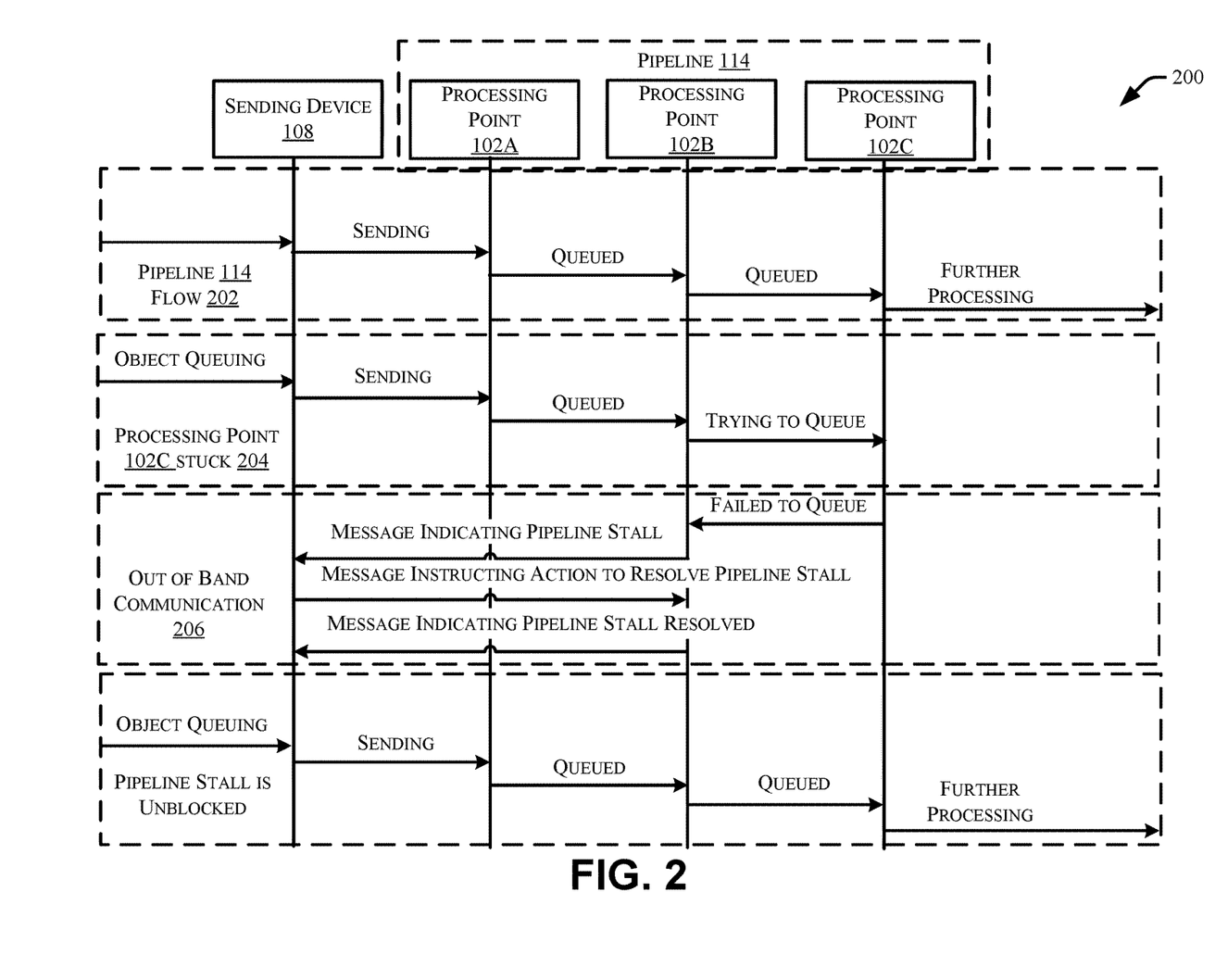
FIG. 2 is a diagram that illustrates pipeline processing points providing feedback to the sending device and receiving instructions from the sending device to assist in recovering from a pipeline stall.

FIG. 2 is a diagram 200 that illustrates pipeline processing points 102 providing feedback to the sending device 108 and receiving instructions from the sending device to assist in recovering from a pipeline stall. As illustrated, diagram 200 shows communications between the sending device and different processing points 102 of a pipeline 114. Initially, at pipeline flow 202, the pipeline 114 is operating according to the specified latency constraints, and the pipeline 114 is not stalled. At flow 204, a pipeline stall has been identified at processing point 102C. The pipeline stall may be detected by processing point 102B, processing point 102C, and/or at some other point within the pipeline 114. During a pipeline stall, processing point 102C is unable to process and queue data received from processing point 102B. In the current example, processing point 102B has been notified that processing point 102C was unable to queue data sent by processing point 102B to processing point 102C. After identifying the pipeline stall, processing point 102B sends an out-of-band communication to the sending device 108 that indicates the pipeline stall at processing point 102C.

In response to receiving the information, the sending device 108 determines the action(s) to perform and instructs one or more of the processing points 102 what actions to perform to assist in resolving the pipeline stall. In the current flow 206, the sending device 108 instructs processing point 102B to perform an action. The sending device 108 may also instruct different processing points to perform one or more actions. Some actions include, but are not limited to, dropping a specified amount of data from a buffer associated with a remote processing pipeline, storing data at the sending device, dropping data at a specified rate, stop dropping data at the specified rate, and the like.

Figure 3:
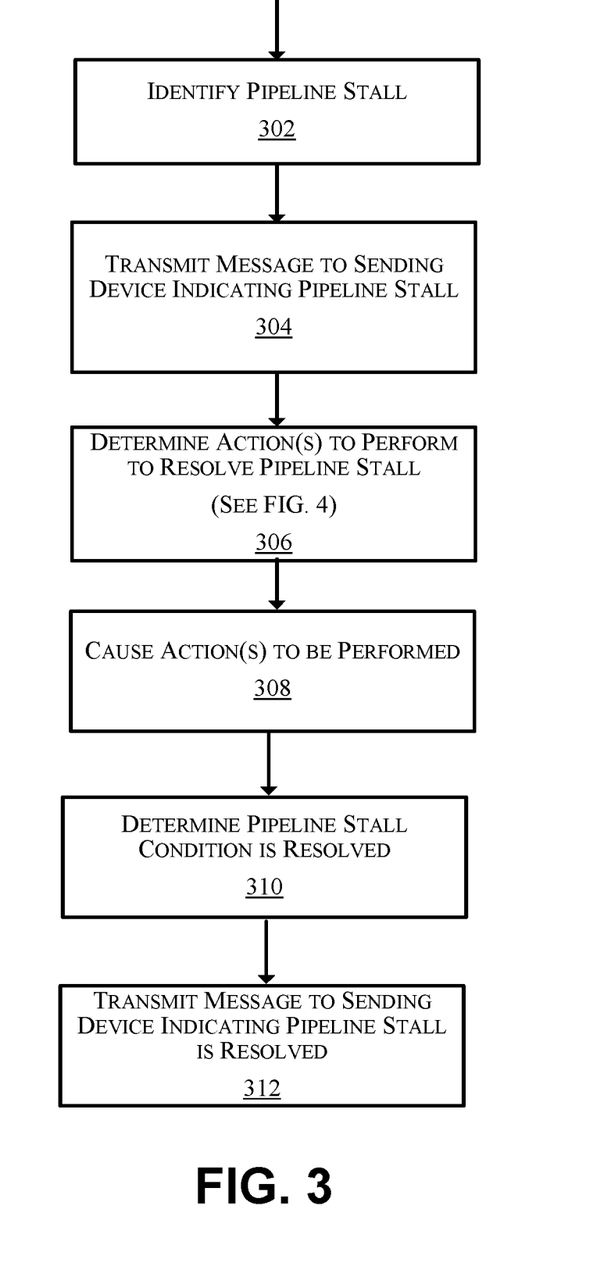
FIG. 3 is a flowchart illustrating a process for pipeline recovery after a pipeline stall.

FIG. 3 is a flowchart illustrating a process for pipeline recovery after a pipeline stall. At 302, a pipeline stall is identified. As discussed above, the pipeline stall may be identified by one or more processing points 102 that are part of a pipeline 114. In some examples, a pipeline agent 106 identifies that a pipeline processing point 102 is not processing data according to specified latency constraints. In some examples, the pipeline agent 106 may determine that another pipeline processing point 102 is not queuing data 116 sent to it.

At 304, a message is transmitted to a pipeline manager 110 that identifies the pipeline stall. As discussed above, one or more of the pipeline processing points 102 may send a message to the pipeline manager 110 of the sending device 108 that identifies the pipeline stall at one or more points within the pipeline 114.

At 306, the action(s) to perform to resolve the pipeline stall are determined. As discussed above, the pipeline manager 110 may determine to perform actions such as, but not limited to dropping a specified amount of data from a queue 104 associated with the pipeline 114, storing data within a queue 104A at the sending device 108, dropping data at a specified rate (e.g., either at the sending device and/or at one or more of the processing points 102), stop dropping data at the specified rate, and the like. See FIG. 4 and related discussion for further details.

At 308, the actions to resolve the pipeline stall are caused to be performed. As discussed above, the pipeline manager 110, or some other component or device, may instruct one or more of the processing points to perform the requested actions to resolve the pipeline stall.

At 310, a determination is made that the pipeline stall is resolved. As discussed above, a pipeline agent 106 of a processing point 102 can determine that a pipeline stall is resolved. For instance, a processing point 102 may determine that it is operating within the specified latency constraints.

At 312, a message is sent to the sending device 108 that indicates that the pipeline stall is resolved. According to some configurations, the pipeline manager 110 of the sending device 108 may also receive information from the pipeline 114 as to the states of the different processing points 102 within the pipeline 114. For instance, the sending device 108 may receive information from the different processing points 102 of the pipeline 114 indicating buffer states (e.g., full, near full, empty) of the queues 104, and/or indicating that the pipeline 114 has experienced some other condition/event (e.g., lost network connectivity, computing failure, . . . ). In response to receiving the information, the sending device 108 may determine the actions to perform.

Figure 4:
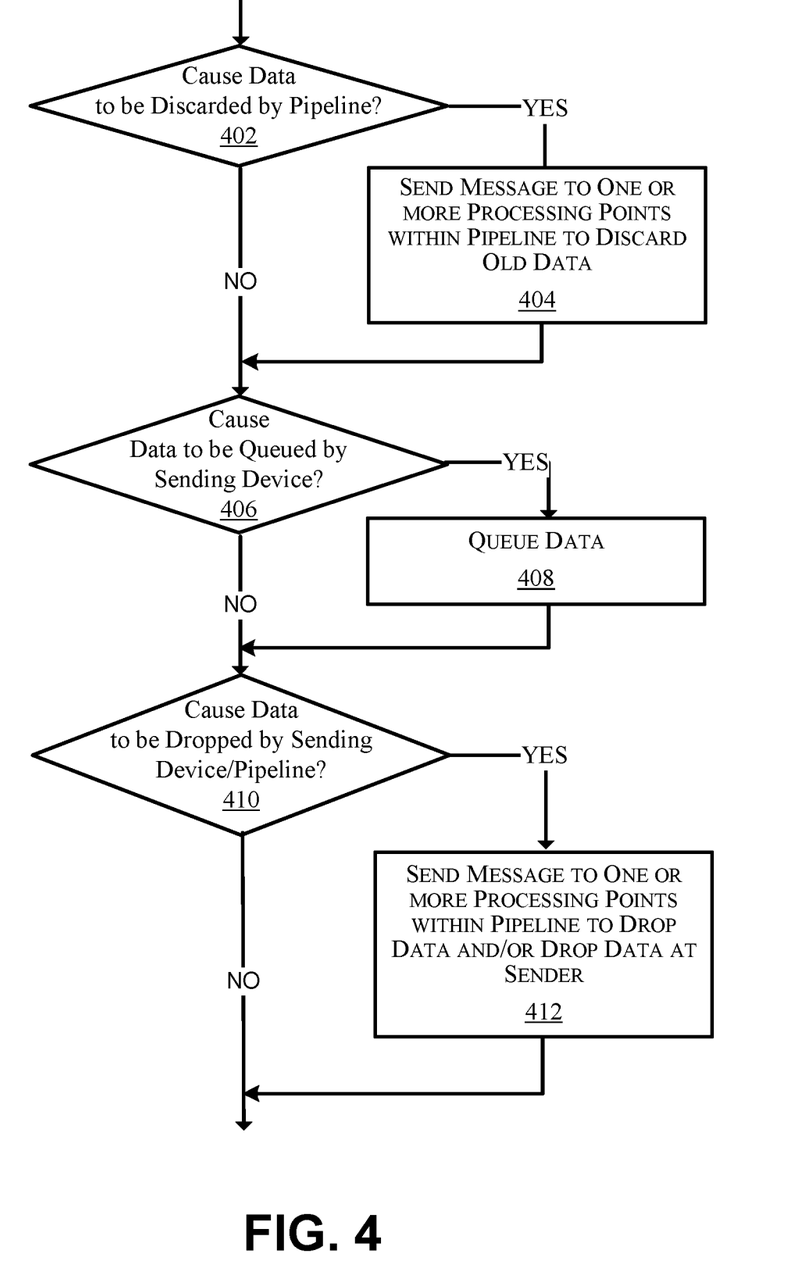
FIG. 4 is a flowchart illustrating a process for performing different actions to assist in resolving a pipeline stall.

FIG. 4 is a flowchart illustrating a process for performing different actions to assist in resolving a pipeline stall. At 402, a determination is made as to whether to cause data to be discarded by the pipeline 114. As discussed above, the pipeline manager 110 may instruct one or more of the processing points 102 to drop data (e.g., the older data) from the associated queue 104 such that more recent data is processed when the pipeline stall is resolved. When data is to be discarded, the process moves to 404. When data is not to be discarded, the process moves to 406.

At 404, a message is sent to one or more of the processing points 102 of the pipeline 114 that instructs at least one of the processing points 102 to drop data. As discussed above, the message may be sent by the sending device 108 to one or more of the processing points 102.

At 406, a determination is made as to whether to cause data to be queued by the sending device. As discussed above, the pipeline manager 110 may determine to queue data within a queue 104A of the sending device 108. When data is to be queued, the process moves to 408. When data is not to be discarded, the process moves to 410.

At 408, the data to be processed by the pipeline 114 is queued. As discussed above, the pipeline manager 110 may store data within queue 104A.

At 410, a determination is made as to whether to cause data to be dropped by the sending device 108 and/or one or more of the processing points 102 of the pipeline 114. As discussed above, the pipeline manager 110 may instruct one or more processing points 102 to drop certain data (e.g., every second event, third event, fifth event, . . . ), or may itself drop data before it is sent to the pipeline 114 for processing. In some examples, the sender and the processing points 102 may keep time synchronization. During normal operation (e.g., a stall condition not detected), the sending device 108 periodically sends the oldest timestamp that should be processed by the processing point 102. The sending device can establish that timestamp by tracking sessions/connections setup and teardown. The processing point 102 may drop any data that has an older timestamp. In other configurations, the sending device 108 can adjust the data sent based on the processing ability of the remote pipeline. When data is to be dropped, the process moves to 412. When data is not to be dropped, the process continues to process other actions.

At 412, a message is sent to one or more of the processing points 102 that indicates to drop data. As discussed above, the message may be sent by the pipeline manager 110 of the sending device 108.

Figure 5:
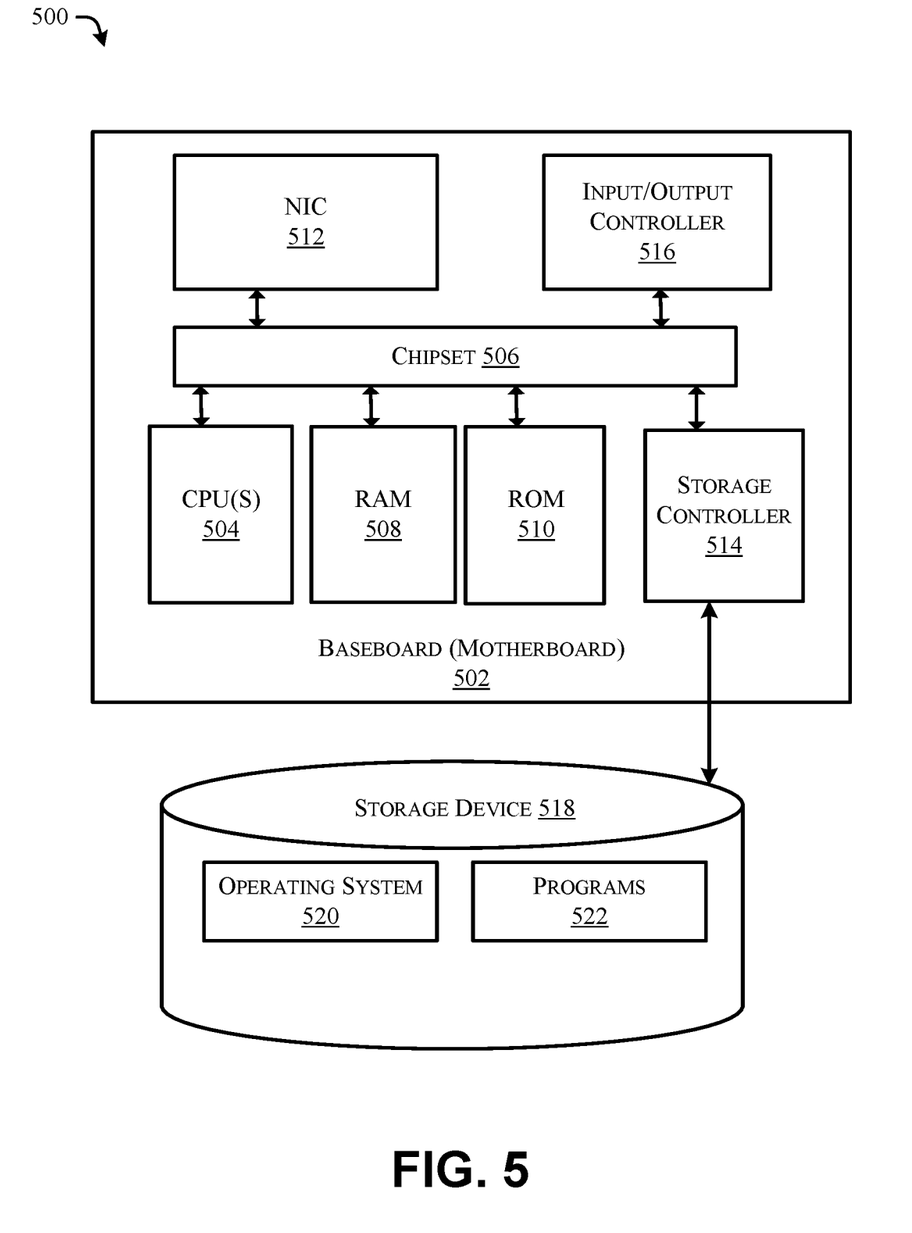
FIG. 5 illustrates an example computer architecture for a computer capable of executing program components for implementing the functionality described herein.

FIG. 5 illustrates an example computer architecture for a computer 500 capable of executing program components for implementing the functionality described above. The computer architecture shown in FIG. 5 illustrates an architecture of a server computer, workstation, desktop computer, laptop, tablet, network appliance, e-reader, smartphone, network switch, or other computing device, and can be utilized to execute any of the software components presented herein. The computer 500 may, in some examples, correspond to a network infrastructure device discussed herein.

The computer 500 includes a baseboard 502, or "motherboard," which may be a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be, for example, standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein. As illustrated in FIG. 5, the ROM 510 or NVRAM can also store data usable by the computer 500 to generate and/or process attestation information in messages exchanged among the computer 500 and other devices. In other examples, this data may be stored elsewhere, such as in RAM 508.

The computer 500 can operate in a networked environment using logical connections to remote computing devices and computer systems through a network. For example, the chipset 506 can include functionality for providing network connectivity through a Network Interface Controller (NIC) 512, such as a gigabit Ethernet adapter. The NIC 512 can connect the computer 500 to other computing devices over a network. It should be appreciated that multiple NICs 512 can be present in the computer 500, connecting the computer to other types of networks and remote computer systems. In some instances, the NICs 512 may include at least one ingress port and/or at least one egress port. An input/output controller 516 may be provided for other types of input/output.

The computer 500 can be connected to a storage device 518 that provides non-volatile storage for the computer. The storage device 518 can store an operating system 520, programs 522, and data, for example. The storage device 518 can be connected to the computer 500 through a storage controller 514 connected to the chipset 506. The storage device 518 can include one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data may include, for example, data associated with processing by a pipeline 114.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like. For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the storage device 518 described above, the computer 500 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 500.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   receiving, at a pipeline of a cloud-based system, first data that is sent from a sending device and over a wide area network (WAN) to the cloud-based system, wherein the first data is to be processed by the pipeline of the cloud-based system and the sending device is located remotely from the cloud-based system;
   determining, by the pipeline, a pipeline stall that indicates that the pipeline is unable to process the first data according to a specified latency constraint;
   transmitting, from the pipeline and over the WAN, second data to the sending device that indicates the pipeline stall;
   receiving third data, from the sending device, over the WAN, and at the cloud-based system, that instructs the pipeline to perform one or more actions associated with the first data to resolve the pipeline stall;
   causing the pipeline to perform the one or more actions associated with the first data;
   determining that the pipeline stall is resolved; and
   transmitting, from the pipeline, fourth data to the sending device that indicates that the pipeline stall is resolved.

2. The method of claim 1, wherein the one or more actions includes causing a first portion of the first data to be discarded, wherein the first portion of the first data is received by the pipeline before a second portion of the first data.

3. The method of claim 1, wherein the one or more actions includes causing data to be removed from a buffer that is associated with the pipeline.

4. The method of claim 1, further comprising queuing fifth data within a buffer associated with the sending device based, at least in part, on the second data.

5. The method of claim 1, further comprising determining, by the sending device, fifth data to discard before sending sixth data to the pipeline for processing.

6. The method of claim 1, wherein the one or more actions includes causing the pipeline to drop received data from processing.

7. The method of claim 1, further comprising instructing the pipeline to process the first data based, at least in part, on the fourth data.

8. The method of claim 1, wherein the one or more actions includes causing the pipeline to process the first data based at least in part on a timestamp sent by the sending device, wherein a portion of the first data that is older than the timestamp is discarded.

9. The method of claim 1, wherein the sending device is an Internet of Things (IoT) device that generates and transmits the first data for the pipeline to process.

10. A cloud-based system, comprising:
    one or more processors; and
    one or more non-transitory computer-readable media storing computer-executable instructions that, when executed by the one or more processors, cause the one or more processors to perform operations of:
    receiving, at a pipeline of the cloud-based system, first data that is sent from a sending device and over a wide area network (WAN) to the cloud-based system, wherein the first data is to be processed by the pipeline of the cloud-based system and the sending device generates the first data and is located remotely from the cloud-based system;
    determining, by the pipeline, a pipeline stall that indicates that the pipeline is unable to process the first data at a specified latency constraint;

transmitting, from the pipeline and over the WAN, second data to the sending device that indicates the pipeline stall;

receiving third data, from the sending device, at the cloud-based system, and over the WAN, that instructs the pipeline to perform one or more actions associated with the first data to resolve the pipeline stall;

causing the pipeline to perform the one or more actions associated with the first data;

determining that the pipeline stall is resolved; and transmitting, from the pipeline, fourth data to the sending device that indicates that the pipeline stall is resolved.

11. The cloud-based system of claim 10, wherein the one or more actions includes causing a first portion of the first data to be discarded, wherein the first portion of the first data is received by the pipeline before a second portion of the first data.

12. The cloud-based system of claim 10, wherein the one or more actions includes causing data to be removed from a buffer that is associated with the pipeline.

13. The cloud-based system of claim 10, the operations further comprising queuing fifth data within a buffer associated with the sending device based, at least in part, on the second data.

14. The cloud-based system of claim 10, determining, by the sending device, fifth data to discard before sending sixth data to the pipeline for processing.

15. The cloud-based system of claim 10, wherein the one or more actions includes causing the pipeline to drop received data from processing.

16. The cloud-based system of claim 10, the operations further comprising instructing the pipeline to process the first data based, at least in part, on the fourth data.

17. The cloud-based system of claim 10, wherein the one or more actions includes causing the pipeline to process the first data based at least in part on a timestamp sent by the sending device, wherein a portion of the first data that is older than the timestamp is discarded.

18. A non-transitory computer-readable medium storing computer-executable instructions that, when executed by one or more processors, cause the one or more processors to perform operations of:

receiving, at a pipeline of a cloud-based system, first data that is sent from a sending device and over a wide area network (WAN) to the cloud-based system, wherein the first data is to be processed by the pipeline of the cloud-based system and the sending device is located remotely from the cloud-based system;

determining, by the pipeline, a pipeline stall that indicates that the pipeline is unable to process the first data at a specified latency constraint;

transmitting, from the pipeline and over the WAN, second data to the sending device that indicates the pipeline stall;

receiving third data, from the sending device and over the WAN, that instructs the pipeline to perform one or more actions to resolve the pipeline stall; and causing the pipeline to perform the one or more actions.

19. The non-transitory computer-readable medium of claim 18, wherein the one or more actions includes causing a first portion of the first data to be discarded, wherein the first portion of the first data is received by the pipeline before a second portion of the first data.

20. The non-transitory computer-readable medium of claim 18, wherein the one or more actions includes causing data to be removed from a buffer that is associated with the pipeline.

21. The non-transitory computer-readable medium of claim 18, the operations further comprising determining, by the sending device, fifth data to discard before sending sixth data to the pipeline for processing.

* * * * *